United States Patent
Agnihotri et al.

(10) Patent No.: US 7,799,314 B2
(45) Date of Patent: Sep. 21, 2010

(54) HYDROGEN PRODUCTION AND USE IN AN INTERNAL COMBUSTION ENGINE SYSTEM

(75) Inventors: Rajeev Agnihotri, Fairfax, VA (US); Paul J. Berlowitz, Glen Gardner, NJ (US); Frank Hershkowitz, Liberty Corner, NJ (US); Richard F. Socha, Newtown, PA (US); Jeffrey W. Frederick, Centreville, VA (US); Novica S. Rados, Mandeville, LA (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 954 days.

(21) Appl. No.: 11/492,359

(22) Filed: Jul. 25, 2006

(65) Prior Publication Data

US 2007/0059234 A1  Mar. 15, 2007

Related U.S. Application Data

(60) Provisional application No. 60/715,671, filed on Sep. 9, 2005.

(51) Int. Cl.
*C01B 3/24* (2006.01)
*C01B 3/26* (2006.01)

(52) U.S. Cl. .................................................... 423/650
(58) Field of Classification Search .................. 423/650
See application file for complete search history.

(56) References Cited

U.S. PATENT DOCUMENTS

| | | | |
|---|---|---|---|
| 4,200,682 A | | 4/1980 | Sederquist |
| 4,916,104 A * | | 4/1990 | Isogai et al. ............... 502/213 |
| 6,348,278 B1 * | | 2/2002 | LaPierre et al. .............. 429/17 |
| 6,534,033 B1 * | | 3/2003 | Amendola et al. ....... 423/648.1 |
| 6,572,837 B1 * | | 6/2003 | Holland et al. .......... 423/648.1 |
| 6,787,576 B2 | | 9/2004 | Kiss et al. |
| 6,976,354 B2 * | | 12/2005 | Liu .............................. 60/275 |
| 7,045,553 B2 | | 5/2006 | Hershkowitz |
| 7,053,128 B2 | | 5/2006 | Hershkowitz |
| 7,217,303 B2 | | 5/2007 | Hershkowitz et al. |
| 7,491,250 B2 | | 2/2009 | Hershkowitz et al. |
| 7,503,948 B2 | | 3/2009 | Hershkowitz et al. |
| 2004/0191166 A1 | | 9/2004 | Hershkowitz et al. |
| 2005/0201929 A1 | | 9/2005 | Hershkowitz et al. |
| 2006/0183009 A1 | | 8/2006 | Berlowitz et al. |
| 2006/0188760 A1 | | 8/2006 | Hershkowitz et al. |
| 2007/0059234 A1 | | 3/2007 | Agnihotri et al. |
| 2007/0144940 A1 | | 6/2007 | Hershkowitz et al. |

(Continued)

FOREIGN PATENT DOCUMENTS

DE  103 46 267 A1  4/2005

(Continued)

*Primary Examiner*—Melvin C Mayes
*Assistant Examiner*—Kenneth Vaden

(57) ABSTRACT

A method for producing a hydrogen containing gas for use in an internal combustion engine system is provided. The method includes cyclically operating at least two pressure swing reformer reactors such that one is reforming while another is regenerating, thereby producing a continuous stream of hydrogen containing gas. During engine operation exhaust gas is fed to the pressure swing reformer reactor that is undergoing regeneration, thereby supplying at least part of the heat for regeneration. Also, the hydrogen gas produced is used in at least one of (i) the engine; (ii) an engine exhaust treatment device; and (iii) a fuel cell.

19 Claims, 7 Drawing Sheets

U.S. PATENT DOCUMENTS

2008/0038598 A1 2/2008 Berlowitz et al.

FOREIGN PATENT DOCUMENTS

| JP | 06219701 | 9/1994 |
| WO | WO 2004/078646 A1 | 9/2004 |
| WO | WO 2004078646 A1 * | 9/2004 |
| WO | WO 2005029629 A2 * | 3/2005 |

* cited by examiner

HYDROGEN PRODUCTION AND USE IN AN INTERNAL COMBUSTION ENGINE SYSTEM

This application claims the benefit of U.S. Provisional Application No. 60/715,671 filed Sep. 9, 2005.

FIELD OF THE INVENTION

The present invention relates generally to a method and process design for producing a hydrogen rich gas stream and using the hydrogen rich gas stream produced in an internal combustion engine system. More particularly, the invention is concerned with the adaptation of pressure swing reforming for use "on board" vehicles for providing a hydrogen rich gas stream for use in one or more applications in the engine system.

BACKGROUND OF THE INVENTION

Potentially a hydrogen rich gas can be used in a variety of internal combustion engine applications, especially on board gasoline and diesel internal combustion engine vehicles. For example, the availability of a hydrogen rich gas on board a vehicle equipped with a diesel engine could assist in reducing nitrogen oxides in diesel exhaust streams. Also, it could be used for removal of carbon from diesel particulate filters. Similarly, in gasoline vehicles a hydrogen rich gas could be used to extend the lean burn limit of the engine thereby improving the efficiency of the engine. It could be used for exhaust gas treatment. Those, of course, are just a few of the uses for a hydrogen rich gas on board a vehicle with an internal combustion engine. Additional uses will be described hereinafter.

Notwithstanding the potential use of hydrogen rich gas with internal combustion engine systems there is a need for practical methods for providing the hydrogen rich gas on board a vehicle.

Hydrogen may be produced from hydrocarbons in a fuel processor such as a steam reformer, a partial oxidation reactor or an auto-thermal reformer and a fuel cell system incorporating such hydrocarbon fuel processors has been proposed.

In the case of a steam reforming, steam is reacted with a hydrocarbon containing feed to produce a hydrogen-rich synthesis gas. The general stoichiometry, illustrated with methane, is:

$$CH_4 + H_2O \rightarrow CO + 3H_2 \quad (1)$$

Typically an excess of steam is used to drive the equilibrium to the right. As applied to hydrogen manufacture, excess steam also serves to increase the water gas shift reaction:

$$CO + H_2O \rightarrow CO_2 + H_2 \quad (2)$$

Because of the high endothermicity of the reaction, steam reforming is typically carried out in catalyst packed tubes positioned within a furnace that occupies a volume of space substantially greater than the tube volume. The large size of such conventional steam reformer is one factor that limits its use in space constrained applications such as on board vehicles.

Gas phase partial oxidation of hydrocarbons to produce hydrogen evolves involves feeding a hydrocarbon and sub-stoichiometric oxygen into a burner where they combust to produce a synthesis gas mixture. The ideal gas phase partial oxidation reaction illustrated for methane is:

$$CH_4 + \tfrac{1}{2}O_2 \rightarrow CO + 2H_2 \quad (3)$$

However, gas-phase reaction kinetics tend to over-oxidize some of the feed, resulting in excessive heat generation and substantial yield of $H_2O$, $CO_2$, unreacted hydrocarbons and soot. For these reasons when gas phase partial oxidation chemistry is applied to clean feeds, it is preferred to add steam to the feed and add a bed of steam reforming catalyst to the gas phase partial oxidation reactor vessel. This combination of gas phase partial oxidation and steam reforming is called autothermal reforming.

In autothermal reforming processes a source of oxygen such as compressed air is employed which results in a nitrogen-diluted synthesis gas that renders the gas less suitable for fuel cell use in space constrained applications.

Sederquist (U.S. Pat. Nos. 4,200,682, 4,240,805, 4,293,315, 4,642,272 and 4,816,353) discloses a steam reforming process in which the heat of reforming is provided within a catalyst bed by cycling between combustion and reforming stages of a cycle.

As described by Sederquist, the high quality of heat recovery within the reforming bed results in a theoretical efficiency of about 97%. However, these patents describe a process that operates at very low productivity, with space velocities of around 100 hr$^{-1}$ (as $C_1$-equivalent). Moreover, this process requires a compressor to compress the product synthesis gas to elevated pressure. One consequence of Sederquist's low space velocity is that resulting high heat losses impede the ability of this technology to achieve the theoretical high efficiency.

Kobayashi et al (U.S. Pat. No. 6,767,530 B2) discloses a steam reforming process in which a hot synthesis gas is produced in a heated regenerative reactor bed. The synthesis gas is then cooled and passed through an adsorber to adsorb synthesis gas species other than hydrogen. Thereafter the adsorbed species are desorbed and combusted with oxidant to produce a hot gas that is used to heat the regenerative reactor bed. Whatever the advantages of this process may be, there is no disclosure as to how to produce the high space velocities and high efficiency required for utilization in compact environments such as on board vehicles.

Hershkowitz et al (US 2003/0235529 A1), incorporated herein by reference, discloses a highly efficient and highly productive process for producing a hydrogen rich containing gas from a hydrocarbon containing fuel, the process being called "pressure swing reforming" or "PSR".

PSR is a cyclic, two step process in which in a first reforming step a hydrocarbon containing feed along with steam is fed into the inlet of a first zone containing reforming catalyst. During the reforming step a temperature gradient across the reforming catalyst has a peak temperature that ranges from about 700° C. to 2000° C. Upon introduction of the reactants, the hydrocarbon is reformed into synthesis gas in the first zone. This reforming step may be performed at a relatively high pressure. The synthesis gas is then passed from the first zone to a second zone where the gas is cooled by transferring its heat to packing material in a second regeneration zone.

The second, regeneration step begins when a gas is introduced into the inlet of the second zone. This gas is heated by the stored heat of the packing material of the recuperation zone. Additionally, an oxygen-containing gas and fuel are combusted near the interface of the two zones, producing a hot flue gas that travels across the first zone, thus reheating that zone to a high enough temperature to reform feed. Once heat regeneration is completed, the cycle is completed and reforming may begin again.

PSR has a number of significant advantages over other synthesis gas processes. For example, the system is compact, making it especially suitable for space constrained applications. Also, the process can be operated at high space velocities making it especially efficient. And, PSR is capable of producing relatively high partial pressures of hydrogen compared to other reforming processes.

The practical application of any synthesis gas production technique or hydrocarbon conversion process will depend upon how well the upstream and downstream processing systems can be combined into an overall process design. The invention described below and defined in the claims provides a unique process design and system for generating a hydrogen rich gas and using the gas produced in an internal combustion engine system in a number of advantageous ways.

SUMMARY OF THE INVENTION

The present invention, in one aspect, provides a method for producing a hydrogen containing gas stream for use in an internal combustion engine system by cyclically operating at least two pressure swing reformer reactors such that at least one reactor is reforming while at least a second reactor is regenerating thereby producing a continuous stream of a hydrogen containing gas. During operation of the engine system which results in an exhaust gas being generated, at least a portion of the exhaust gas is fed to the pressure swing reformer reactor that is being regenerated for use therein in the regeneration process.

In one embodiment at least a portion of the hydrogen containing gas, which optionally may be treated to increase the hydrogen content, is fed to at least one of (i) the engine for combustion therein; (ii) an engine exhaust stream treatment device for enhancement of the treatment therein of the exhaust stream; and (iii) a fuel cell for generating at least a part of the electricity required for operating an electrical device.

The embodiments, features, and advantages of the invention will be appreciated and understood by those skilled in the art from the following detailed description, drawings and appended claims.

DETAILED DESCRIPTION OF THE INVENTION

Figure 1A:
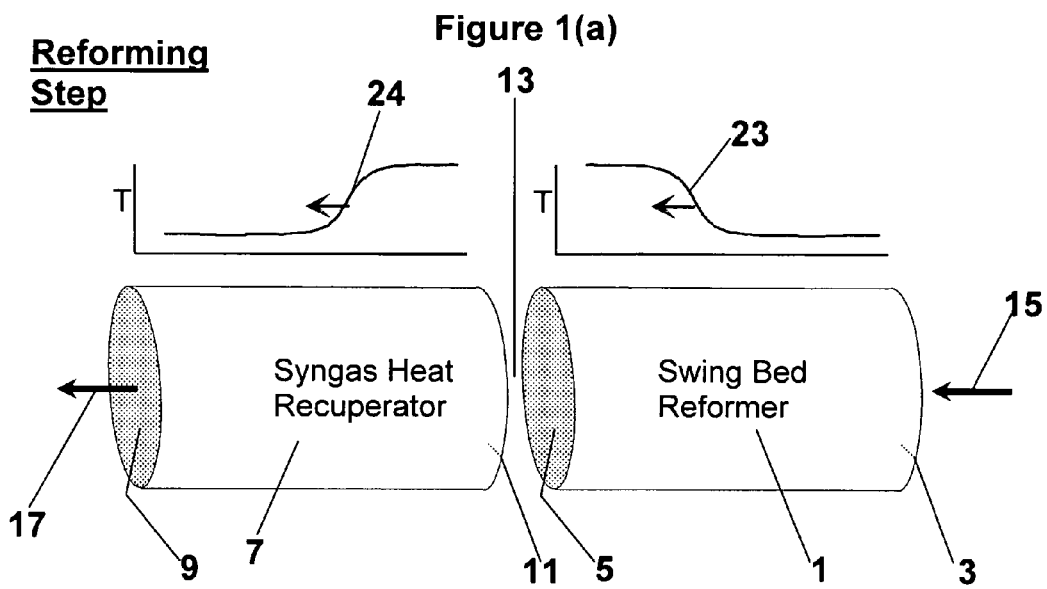
FIGS. 1a and 1b are diagrammatic illustrations of the reforming and regenerating steps of pressure swing reforming.
Figure 1B:
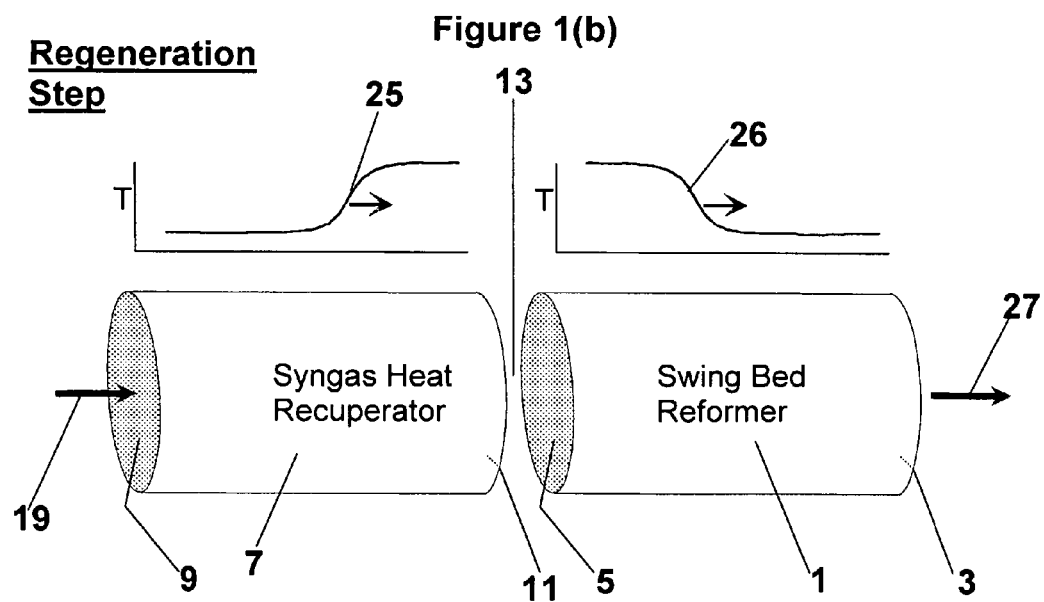

The basic two-step cycle of pressure swing reforming is depicted in FIGS. 1a and 1b in terms of a single bed or reactor having two zones, a first zone, or reforming zone (1) and a second zone, or recuperating zone (7). The beds of both zones will include packing material. While the reforming bed will include catalyst for steam reforming.

As shown in FIG. 1a, at the beginning of the first step of the cycle, also called the reforming step, the reforming zone (1) is at an elevated temperature and the recuperating zone (7) is at a lower temperature than the reforming zone (1). A hydrocarbon-containing feed is introduced via a conduit (15), into a first end (3) of the reforming zone (1) along with steam. The hydrocarbon may be any material that undergoes the endothermic steam reforming reaction including methane, petroleum gases, petroleum distillates, kerosene, jet fuel, fuel oil, heating oil, diesel fuel and gas oil and gasoline. Generally the hydrocarbon used for the purposes of this invention will be gasoline or diesel type fuel. Preferably, the steam will be present in proportion to the hydrocarbon in an amount that results in a steam to carbon ratio between about 1 and about 3 (considering only carbon in the hydrocarbon, not carbon in $CO$ or $CO_2$ species that may be present).

This feed stream picks up heat from the bed and is converted over the catalyst and heat to synthesis gas. As this step proceeds, a temperature profile (23) is created based on the heat transfer properties of the system. When the bed is designed with adequate heat transfer capability, as described herein, this profile has a relatively sharp temperature gradient, which gradient will move across the reforming zone (1) as the step proceeds.

Synthesis gas exits the reforming bed (1) through a second end (5) at an elevated temperature and passes through the recuperating zone (7), entering through a first end (11) and exiting at a second end (9). The recuperating zone (7) is initially at a lower temperature than the reforming zone (1). As the synthesis gas passes through the recuperating zone (7), the synthesis gas is cooled to a temperature approaching the temperature of the zone substantially at the second end (9), which is approximately the same temperature as the regeneration feed introduced during the second step of the cycle via conduit (19) (e.g., from about 20° C. to about 600° C.). As the synthesis gas is cooled in the recuperating zone (7), a temperature gradient (24) is created and moves across the recuperating zone (7) during this step.

At the point between steps, the temperature gradients have moved substantially across the reforming zone (1) and the recuperating zone (7). The zones are sized so that the gradients move across both in comparable time during the above reforming step. The recuperating zone (7) is now at the high temperature and the reforming zone (1) is at low temperature, except for the temperature gradient that exists near the exits of the respective zones. The temperature of the reforming zone (1) near the inlet end (3) has now been cooled to a temperature that approaches the temperature of the hydrocarbon feed that has been entering via conduit (15) (e.g., from about 20° C. to about 600° C.).

In the practice of pressure swing reforming, there are alternative means for determining the end of the reforming step. Toward the end of the reforming step, the temperature at end (5) of the reforming zone is reduced and consequently the reforming performance deteriorates below acceptable conversion efficiencies. Reforming performance, as used herein, refers to the conversion of feed hydrocarbons into synthesis gas components of $H_2$, $CO$ and $CO_2$. The term percent conversion, as used herein, is calculated as the percent conversion of the carbon in feed hydrocarbonaceous species into synthesis gas species of $CO$ and $CO_2$. The term unconverted product hydrocarbons, as used herein, refers to product hydrocarbonaceous species that are not synthesis gas components of $H_2$, $CO$ and $CO_2$. These typically include product methane, as well as feed hydrocarbons and the cracking products of feed hydrocarbons. The reforming step ends when the reforming performance deteriorates to a level that is below acceptable limits. In practice, optimization of the overall reforming and synthesis gas utilization process will dictate a desired, time-averaged level of reforming conversion depending upon the intended end use of the synthesis gas. That time-averaged level of reforming conversion is typically greater than 80%, preferably greater than 90%, and most preferably greater than 95%; however, if the synthesis gas is to be used to generate a hydrogen rich stream for combustion or after treatment, as described in connection with the embodiments of the present invention, then the time-averaged level of reforming conversion typically will be at least 25%, preferable greater than about 50% and most preferably greater than 75%.

The point in time at which the reforming step is ended, and thus the duration of the reforming step, may be chosen (a) as a response to the time-varying performance of the reformer during each reforming step; or (b) based on overall (time-averaged) performance or the system; or (c) fixed as a constant reforming step duration. In case (a), at least one feature of the operation is monitored that is correlated to the reforming performance. This feature may be a composition such as $CH_4$, $H_2$, or CO, or alternatively a temperature, such as the temperature at the end (5) of the reforming bed. In case (b), the reforming step duration is adjusted based on a measured feature that reflects the overall (time-averaged) performance or the system. This may be an average product composition such as $CH_4$, $H_2$, or CO. In case (c), the reforming step duration is of fixed length, at a value that is predetermined to be acceptable for the space velocity of the operation. In one embodiment the present invention, the reforming step duration is fixed at a duration between about 0.1 sec and less than about 60 seconds and preferably between about 1.0 and 30 seconds.

After the synthesis gas is collected via an exit conduit (17) at the second end (9) of the recuperating zone (7), the second step of the cycle, also called the regeneration step begins. The regeneration step, illustrated in FIG. 1b, basically involves transferring the heat from the recuperator bed (7) to the reformer bed (1). In so doing, the temperature gradients 25 and 26 move across the beds similar to but in opposite directions to gradients 23 and 24 during reforming. In a preferred embodiment, an oxygen-containing gas and fuel are introduced via a conduit (19) into the second end (9) of the recuperating zone (7). This mixture flows across the recuperating zone (7) and combusts substantially at the interface (13) of the two zones (1) and (7). In the present invention, the combustion occurs at a region proximate to the interface (13) of the recuperation zone (7) and the reforming zone (1). The term, "region proximate", in the present invention, means the region of the PSR beds in which regeneration step combustion will achieve the following two objectives: (a) the heating of the reforming zone such that end (5) of the reforming zone is at a temperature of at least 800° C., and preferably at least 1000° C. at the end of the regeneration step; and (b) the cooling of the recuperation zone to a sufficient degree that it can perform its function of accepting synthesis gas sensible heat in the subsequent reforming step. Depending on specific regeneration conditions described herein, the region proximate to the interface can include from 0% to about 50% of the volume of the recuperation zone (7), and can include from 0% to about 50% of the volume of the reforming zone (1). In a typical case, greater than 90% of the regeneration step combustion occurs in a region proximate to the interface, the volume of which region includes less than about 20% the volume of the recuperating zone (7) and less than about 20% the volume of reforming zone (1).

The location of combustion may be fixed by introduction of one of the combustion components, e.g., the fuel, at or substantially at, the interface of the two zones (13), while the other component, e.g., the oxygen-containing gas may be introduced at the first end (9) of the recuperating zone (7). Alternatively, the fuel and oxygen-containing gas (19) streams may be mixed at the open-end (9) of the recuperating zone (7) and travel through the zone and combust at the interface of the zones (13). In this situation, the location of combustion is controlled by a combination of temperature, time, fluid dynamics and catalysis. Fuel and oxygen conventionally require a temperature-dependent autoignition time to combust. In another case, the flow of a non-combusting mixture in a first substep of regeneration will set the temperature profile in the recuperating zone (7) such that the zone is not hot enough to ignite until the mixture reaches the interface of the zones.

The presence of catalyst in the reforming zone can also be used to initiate combustion at that location, and a space between the reforming and recuperating zones can be added and designed to further stabilize the combustion process and confine the combustion to the area proximate to the above described interface. In yet another example, the location of combustion is fixed by mechanical design of the recuperating zone. In this design, the fuel and oxygen-containing gas are traveling in separate channels (not shown), which prevent combustion until the feeds combine at the interface of the zones (13). At that location, flame holders (not shown) or a catalyst in the reforming zone will ensure that the combustion occurs.

The combustion of the fuel and oxygen-containing gas creates a hot flue gas that heats the reforming zone (1) as the flue gas travels across that zone. The flue gas then exits through the first end of the reforming zone (3) via a conduit (27). The composition of the oxygen-containing gas/fuel mixture is adjusted to provide the desired temperature of the reforming zone. The composition and hence temperature is adjusted by means of the proportion of combustible to non-combustible portions of the mixture. For example, non-combustible gases such as $H_2O$, $CO_2$, and $N_2$ can be added to the mixture to reduce combustion temperature. In a preferred embodiment, non-combustible gases are obtained by use of steam, flue gas, or oxygen-depleted air as one component of the mixture. When the hot fluegas reaches the temperature gradient within the reformer, the gradient moves further across the bed. The outlet temperature of the fluegas will be substantially equal to the temperature of the reforming zone (1) near the inlet end (3). At the beginning of the regeneration step, this outlet temperature will be substantially equal to the inlet temperature of the reforming feed of the preceding, reforming, step. As the regeneration step proceeds, this outlet temperature will increase slowly and then rapidly as the temperature gradient reaches end (3), and can be 50-500° C. above the temperature of the reforming feed by the end of the step.

In the practice of pressure swing reforming, there are alternative means for determining the end of the regeneration step. The regeneration step ends when sufficient heat has been supplied or conveyed to the reforming bed to enable the carrying out of the reforming step. The point in time at which the regeneration step is ended, and thus the duration of the regeneration step, may be chosen (a) as a response to the time-varying performance of the PSR during each regeneration step; or (b) based on overall (time-averaged) performance or the system; or (c) fixed as a constant regeneration step duration. In case (a), some feature of the operation is monitored that is related to the regeneration performance. This feature could be a composition such as $O_2$, $CH_4$, $H_2$, or CO, or could be a temperature such as the temperature at the end (3) of the reforming bed. In case (b), the regeneration step duration is adjusted based on a measured feature that reflects the overall (time-averaged) performance of the system. This feature may be an average product composition such as $CH_4$, $H_2$, or CO, or some other system measurement. In case (c), the regeneration step duration is of fixed length, at a value that is predetermined to be acceptable for the space velocity of the operation. In one embodiment the present invention, the regeneration step duration is fixed at a duration between about 0.1 second and about 60 seconds and preferably 1.0-30 seconds. In all of these cases, but particularly in case (c), it is preferable to also adjust the regeneration flow rates to increase or decrease the amount of heat added to the bed during the step—in a manner similar to that described with respect to adjustment of duration in case (b), above.

The reforming zone is now, once again, at reforming temperatures suitable for catalytic reforming.

In the practice of the present invention it is frequently advantageous to operate the two steps of the cycle at different pressures. This is advantageous because it is costly to compress air to high pressure, while it is desirable to have synthesis gas at high pressure. Thus, in a preferred embodiment, the reforming step is carried out at higher pressures than the regeneration step. The pressure swing is enabled because of the large volumetric heat capacity difference between the solid and the gas.

Pressure swing reforming operating temperatures and pressures are given in Table 1.

TABLE 1

| | Broad Range | Preferred Range |
|---|---|---|
| Reforming Step Pressure | 0-25 atm | 0-15 atm |
| Regeneration Step Pressure | 0-10 atm | 0-4 atm |
| Reforming Feed Temperature | 20-600° C. | 150-450° C. |
| Regeneration Feed Temperature | 20-600° C. | 150-450° C. |
| Regeneration Peak Bed Temperature | 700-2000° C. | 900-1400° C. |

The space velocity of a system is typically expressed on an hourly basis as the standard volumetric gas flow rate of feed divided by the volume of catalyst bed, called gaseous hourly space velocity, or GHSV. Space velocity can also be defined in terms of the hydrocarbon component of feed. As so defined, the GHSV for a methane feed would be the standard hourly volumetric gas flow rate of methane divided by the bed volume. As used herein, the term space velocity, abbreviated as $C_1GHSV$, refers to the space velocity of any hydrocarbon feed placed on a $C_1$ basis. As such, the hydrocarbon feed rate is calculated as a molar rate of carbon feed, and standard volume rate calculated as if carbon is a gaseous species. For example, a gasoline feed having an average carbon number of 7.0 that is flowing at a gaseous flow rate of 1,000 NL/hour into a 1.0 L bed would be said to have a space velocity of 7,000. This definition is based on feed flow during the reforming step and wherein the bed volume includes all catalysts and heat transfer solids in the reforming and recuperating zones.

In pressure swing reforming, the space velocity, $C_1GSHSV$, typically ranges from about 1,000 to about 50,000.

In a preferred embodiment pressure swing reforming is conducted under bed packing and space velocity conditions that provide adequate heat transfer rates, as characterized by a heat transfer parameter, $\Delta T_{HT}$, of between about 0.1° C. to about 500° C., and more preferably between about 0.5° C. and 40° C. The parameter $\Delta T_{HT}$ is the ratio of the bed-average volumetric heat transfer rate that is needed for reforming, H, to the volumetric heat transfer coefficient of the bed, $h_v$. The volumetric heat transfer rate that is needed for reforming is calculated as the product of the space velocity with the heat of reforming (on heat per $C_1$ volume basis). For example, H=4.9 cal/cc/s=2.2 cal/cc*8000 hr$^{-1}$/3600 s/hr, where 2.2 cal/cc is the heat of reforming of methane per standard volume of methane, and 8000 is the $C_1$GHSV of methane. When the duration of reform and regeneration steps are comparable, the value of H will be comparable in the two steps. The volumetric heat transfer coefficient of the bed, $h_v$, is known in the art, and is typically calculated as the product of a area-based coefficient (e.g., cal/cm$^2$s° C.) and a specific surface area for heat transfer ($a_v$, e.g., cm$^2$/cm$^3$), often referred to as the wetted area of the packing.

For PSR, reforming step feed temperatures range from about 20° C. to about 600° C., and preferably from about 150° C. to about 450° C. Regeneration feed temperatures are substantially similar, ranging from about 20° C. to about 600° C. and preferably from about 150° C. to about 450° C. Different embodiments for the integration of the PSR with a fuel cell and optional synthesis gas modification and/or separation processes, detailed hereinafter, will have different most-preferred temperatures for PSR feeds. The temporal isolation of the reforming step from the regeneration step provides the opportunity to operate these steps at substantially different pressures, in a way that is advantageous to the PSR/Fuel Cell system. Thus, reforming step pressures for PSR as taught herein are in atmosphere gauge pressures and range from about zero (0) atmosphere to about twenty five (25) atmospheres, and preferably from about zero (0) atmospheres to about fifteen (15) atmospheres. Regeneration step pressures range from about zero atmosphere to about ten (10) atmospheres, and preferably from about zero (0) atmosphere to about four (4) atmospheres.

Figure 2:
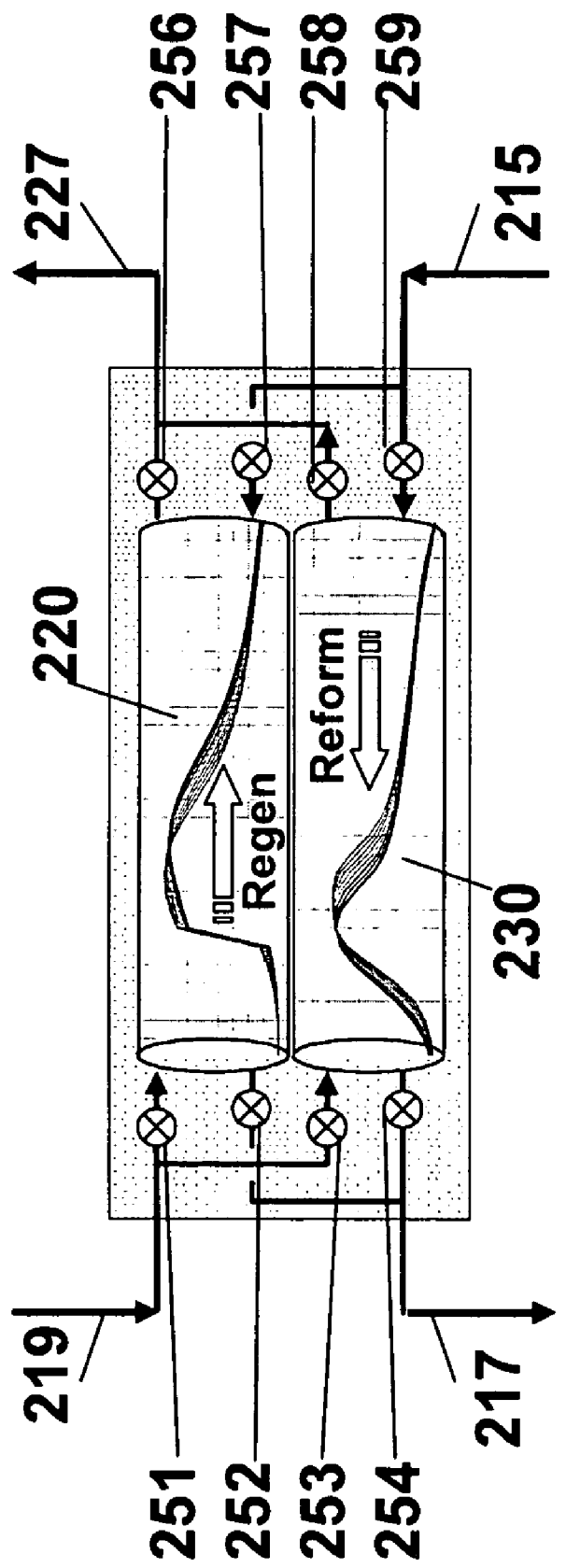
FIG. 2 is a diagrammatic illustration of pressure swing reforming using a two reactor valved system.

FIG. 2 shows an embodiment of pressure swing reforming utilized in the practice of the present invention. In this example, two pressure swing reforming bed systems or reactors are used simultaneously such that one system is reforming while the other is regenerating. The use of multiple bed systems or reactors can provide a continuous flow of reformed product notwithstanding the cyclical operation of each bed. In FIG. 2, a first bed (220) is engaged in the step of regeneration, while a second bed (230) is engaged in the step of reforming. Each bed (220 and 230) includes both reforming and recuperating zones. In this example, several sets of valves are used to control the various streams flowing to and from the beds. A first set of valves (257 and 259) controls the flow of hydrocarbon feed and steam feed to the beds, while a second set of valves (252 and 254) control the flow of the product of the reforming step exiting the recuperating zones. The third set of valves (251 and 253) regulate the flow of oxygen-containing gas/fuel and optional non-combusting gas to the beds and the fourth set of valves (256 and 258) control the flow of fluegas exiting the reforming zone.

In operation, when valves 251, 254, 256, and 259 are open, valves 252, 253, 257 and 258 are closed. With these valve states, oxygen containing gas and fuel (219) enter the bed (220) through valve 251 while fluegas (227) exits the bed (220) through valve 256. Concurrently, the hydrocarbon and steam feed (215) enters the second bed (230) through valve 259 while the product of reforming (217) exits this bed (230) through valve 254. At the conclusion of this step, valves 252, 253, 257 and 259 now open and valves 251, 254, 256 and 257 now close, and the cycle reverses, with the first bed (220) reforming the feed and the second bed (230) regenerating the heat.

The heat transfer characteristics of the bed packing material are set to enable the high space velocity.

It is well known in the art that bed packing can be characterized for heat transfer coefficient (h) and characterized for heat transfer surface area (often referred to as wetted area, $a_v$). Correlations for these parameters, based on gas and solid properties, are well known. The product of these two parameters is the bed's heat transfer coefficient on a bed volume basis:

Volumetric heat transfer coefficient:

$$h_V = \frac{BTU}{(ft^3 Bed)(°F.)(s)} \text{ or } = \frac{kcal}{(LBed)(°C.)(s)}$$

The heat transfer coefficients are sensitive to a variety of gas proper-ties, including flow rate and composition. Coefficients are typically higher during reforming because the hydrogen in the gas has very high thermal conductivity. Coefficients are typically increased by decreasing the characteristic size of the packing (e.g., hence ⅛" beads will have higher $h_v$ than ½" beads).

The heat of reforming of hydrocarbons is well known, and can be expressed on a basis of units of heat per standard volume of hydrocarbon gas. The heat transfer requirement for this PSR system can be expressed as the product of volumetric heat of reforming with the GHSV of the feed.

Volumetric heat transfer requirements of the system are expressed as:

$$H = \frac{GHSV \cdot \Delta H_{REF}}{3600 \text{ s/hr}} = \frac{BTU}{(ft^3 Bed)(s)} \text{ or } = \frac{kcal}{(LBed)(s)}$$

In this equation, GHSV and $\Delta H_{REF}$ have substantially identical units of feed amount. Thus, if the units of GHSV are as NL/hr of $C_1$ per L bed, then the units of $\Delta H_{REF}$ are heat of reaction per NL of $C_1$.

A heat transfer delta-temperature $\Delta T_{HT}$, is also used herein to characterize the PSR system, as taught herein. $\Delta T_{HT}$ is defined herein as the ratio of volumetric heat transfer requirement to volumetric heat transfer coefficient. Characteristic heat transfer $\Delta T_{HT} = H/h_v$.

This characteristic $\Delta T_{HT}$ describes the balance between heat transfer supply and demand. As used herein, the $\Delta T_{HT}$ is calculated using heat transfer coefficients based on typical regeneration conditions. The characteristic $\Delta T_{HT}$ is a basic design parameter for the present invention. Packing or space velocity are chosen to satisfy characteristic $\Delta T_{HT}$ requirements of this invention.

In pressure swing reforming, the characteristic $\Delta T_{HT}$ should be between about 0.1° C. and about 500° C. More preferably, the characteristic $\Delta T$ should be between about 0.5° C. and 40° C.

As an example, if a packing has a heat transfer coefficient of 10 BTU/ft³s° F., then given a methane heat of reforming of 248 BTU/scf the $C_1$GHSV achievable at a characteristic $\Delta T_{HT}$ of 40° C., would be ~1.5×10⁴ hr⁻¹. Given bed-packing materials that are presently known in the art, including particulate packing, and foam and honeycomb monoliths, the present invention can be operated at high efficiency at a space velocity up to about 100,000 hr⁻¹.

In a preferred embodiment the bed packing material will have several characteristics. It will have the ability to cycle repeatedly between high (e.g., ≧1000° C.) and low (e.g., ≦600° C.) temperatures, provide high wetted area (e.g., ≧6 cm⁻¹) and volumetric heat transfer coefficient (e.g., ≧0.02 cal/cm³s° C., preferably ≧0.05 cal/cm³·° C., and most preferably ≧0.10 cal/cm³s° C.), have low resistance to flow (i.e., low pressure-drop), have operating temperature consistent with the highest temperatures encountered during regeneration, and have high resistance to thermal shock. Furthermore, it is preferred that the material has high bulk heat capacity (e.g., ≧0.10 cal/cm³·° C. and preferably ≧0.20 cal/cm³·° C.). Additionally, the bed packing material will provide sufficient support for the reforming catalyst in the reforming bed. These requirements are met via control of the shape, size, and composition of the bed packing materials.

The shape and size of the bed packing material impact the beds heat transfer capability and flow resistance. This is because packing shape and size impact how the fluid flows through the packing, including, most importantly, the size and turbulence in the fluid boundary layers that are the primary resistance to heat, mass and momentum transfer between fluid and solid. Furthermore, the size of the materials also impacts thermal shock resistance of the bed, because larger structures are typically susceptible to thermal shock. The shape impacts bed heat capacity through its relationship on bed void volume. The design of advantageous packing shapes to achieve these aspects of the invention is well know in the art.

Examples of suitable packing materials include honeycomb monoliths and wall-flow monoliths, which have straight channels to minimize pressure drop and enable greater reactor length. Preferred honeycomb monoliths for the present invention will have channel densities that range from about 100 channels/in² to about 3200 channels/in² (15-500 channels/cm²). In an alternate embodiment more tortuous packing, such as foam monoliths and packed beds may be employed. Preferred foam monoliths for the present invention will have pore densities that range from about 10 ppi (pores per inch) to about 100 ppi (i.e., 4-40 pore/cm). Preferred packed beds for the present invention will have packing with wetted surface area that range from about 180 ft⁻¹ to about 3000 ft⁻¹ (i.e., 6-100 cm⁻¹).

The composition of the bed packing material is important to operating temperature and thermal shock resistance. Thermal shock resistance is generally greatest for materials having low coefficients of thermal expansion, because it is the temperature-induced change in size that stresses a component when temperatures are changing due to cycling. Ceramic materials have been developed that are resistant to combustion temperatures and thermal shock, particularly for application in engine exhaust filters and regenerative thermal oxidizers. Cordierite materials (magnesium aluminum silicates) are preferred for their very low coefficients of thermal expansion. Preferred materials of construction include aluminum silicate clays, such as kaolin, aluminum silicate clay mixed with alumina, or aluminum silicate clay and alumina mixed with silica and optionally zeolites. Other candidate materials of construction include mullite, alumina, silica-alumina, zirconia, and generally any inorganic oxide materials or other materials stable to at least 1000° C. The materials may be used alone or in combination, and may have their structures stabilized, for example by use of rare earth additives. The bed packing materials of the regenerating zone can either be the same or different from the packing materials of the reforming zone.

The configuration of the beds within the reforming and recuperating zones may take the many forms that are known in the art. Acceptable configurations include horizontal beds, vertical beds, radial beds, and co-annular beds. Packing may be monolithic or particulate in design. Particulate packing may become fluidized during some steps of the present invention. In a preferred embodiment, bed packing is maintained in a fixed arrangement.

Figure 3:
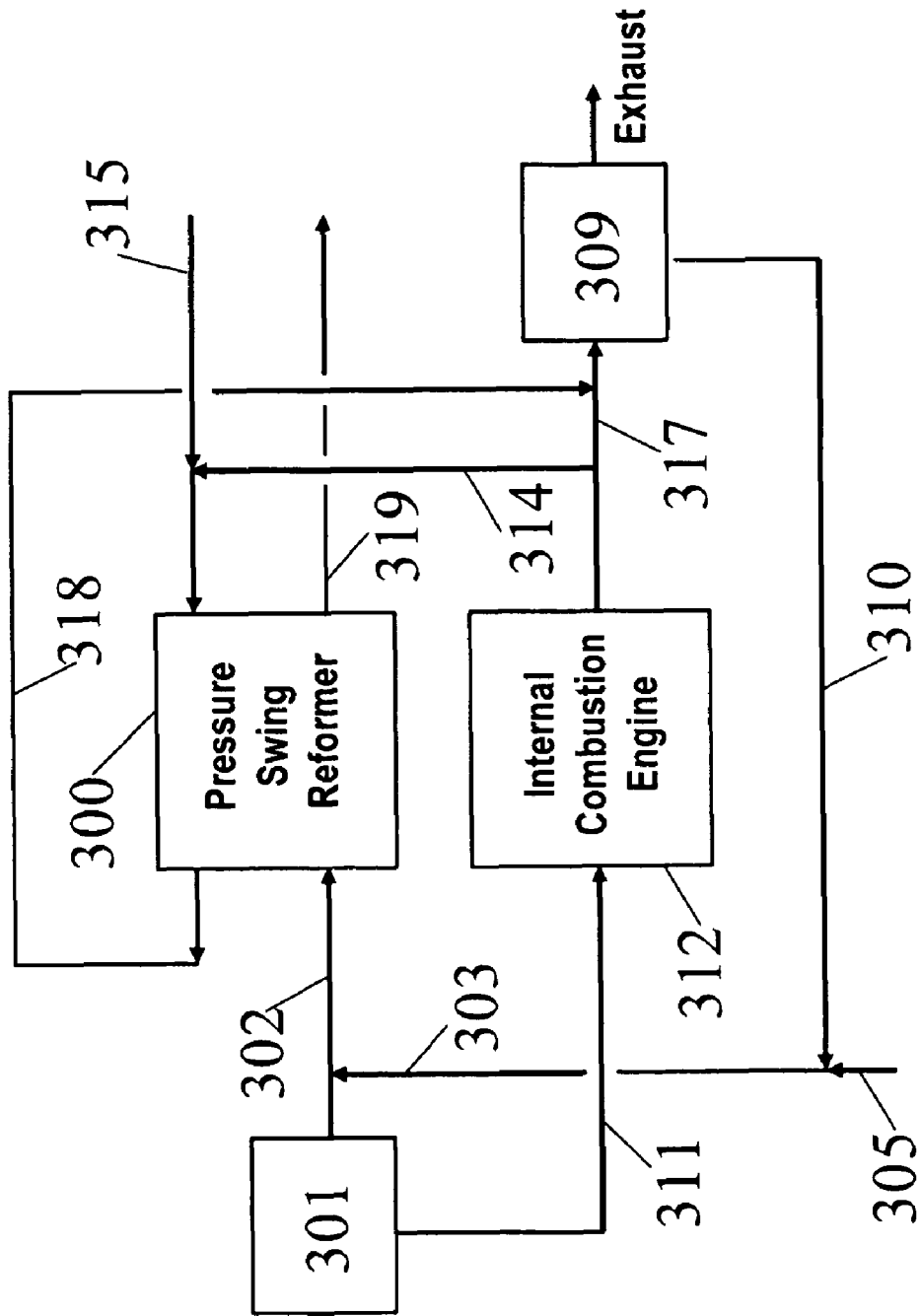
FIG. 3 illustrates an embodiment of the invention using the two reactor valved system of FIG. 2.

An embodiment of the present invention will now be described in connection with FIG. 3. In this embodiment there is shown a hydrocarbon fuel source 301, a two reactor pressure swing reformer system 300 such as that described in connection with FIG. 2. Also shown is an internal combustion engine 312. In this embodiment fuel from fuel source 301 and steam from line 303 are fed via line 302 to the steam reforming reactor of the two pressure swing reformer reactors of system 300. Water for the steam may be stored on-board in a water storage container (not shown) and delivered via line 305, or it may be obtained from the exhaust gas condenser 309 and delivered via line 310 or from both. The steam is generated from the water typically by heat exchange with the engine exhaust gas. For simplification such heat exchanger is not shown. Optionally, the steam may be obtained directly from the hot exhaust gas. Fuel is fed via line 311 to internal combustion engine 312. The pressure swing reactors are operated cyclically with one of the two operating in the reforming mode and the other in the regenerating mode. Thus, a hydrogen containing gas stream, i.e., a syn gas stream having an $H_2$:CO ratio greater than 2:1 is generated continuously and exits system 300 via line 319. During the operation of the engine an exhaust gas stream is generated, a portion of which is fed via line 314 to the reactor of system 300 that is operating in the regenerating mode, and the balance of the exhaust gas is delivered via line 317 to exhaust gas condenser 309. Not only is the exhaust gas composition similar to that required for regeneration of a PSR reactor, but the present invention also advantageously uses the "waste" heat of the exhaust gas. Optionally, air and a fuel may be supplied via line 315 for combustion in the regenerating reactor to provide additional heat, if necessary, to reach the desired bed temperature for the reforming step when the cycle is reversed.

In the embodiment described in connection with FIG. 3 the hydrocarbon fuel may be a diesel fuel or gasoline and the engine a diesel engine or spark ignited engine respectively. Also in the embodiment of FIG. 3 more than two reactors may be used. For example, five or more reactors may be used.

Figure 4:
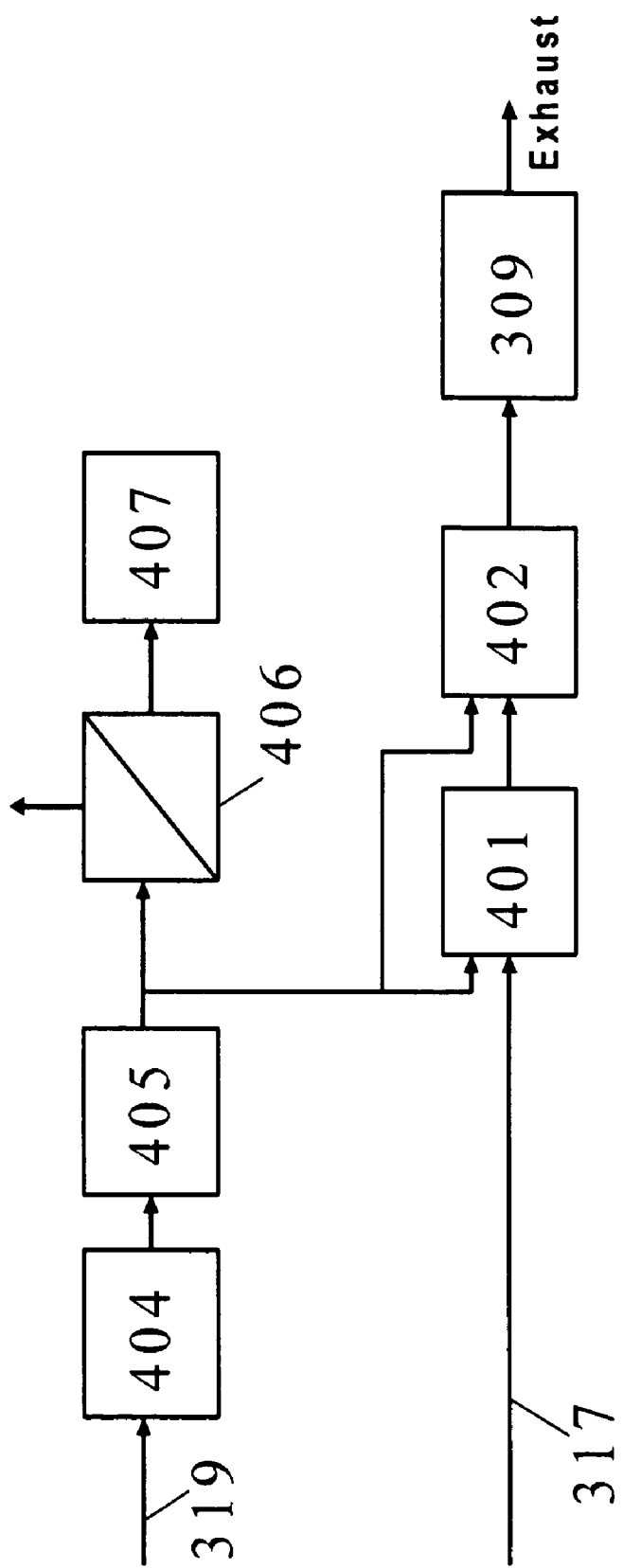
FIGS. 4, 5 and 6 illustrate further embodiments of the invention illustrated in FIG. 3.

Several embodiments of the invention now will be described specifically in connection with a diesel engine system. In these embodiments diesel fuel from fuel source 301 is combusted in engine 312 and a portion is steam reformed in system 300 as is shown in FIG. 3. The engine exhaust gas stream 317 and the hydrogen containing gas stream 319 are further treated and utilized in a number of optional ways as illustrated in FIG. 4. Thus the diesel engine exhaust is treated in one or more exhaust gas treatment devices such as an $NO_x$ mitigation device 401, a diesel particulate filter device 402 or both before being sent to exhaust gas condenser 309. Similarly the hydrogen containing gas may be optionally and preferably treated in a water gas shift reactor 404 to increase the hydrogen content and lower the CO content of the gas stream. The hydrogen containing gas may also be physically treated in device 405 to adjust the temperature and pressure of the gas stream. After any such treatment a portion of the hydrogen containing gas may be utilized, when desirable, as a reductant in $NO_x$ mitigation device 401 or as a fuel in diesel particulate filter 402 to burn off particulate so as to enhance the performance of such devices. Optionally part or all of the hydrogen enriched gas stream may be separated in separator 406 to provide a stream of substantially pure hydrogen for use as a fuel in fuel cell 407 to provide electricity to the vehicle in lieu of or in addition to the alternator battery system or to power auxiliary electrical devices. The separator 406 may be a membrane separator or a pressure swing adsorption separator.

Figure 5:
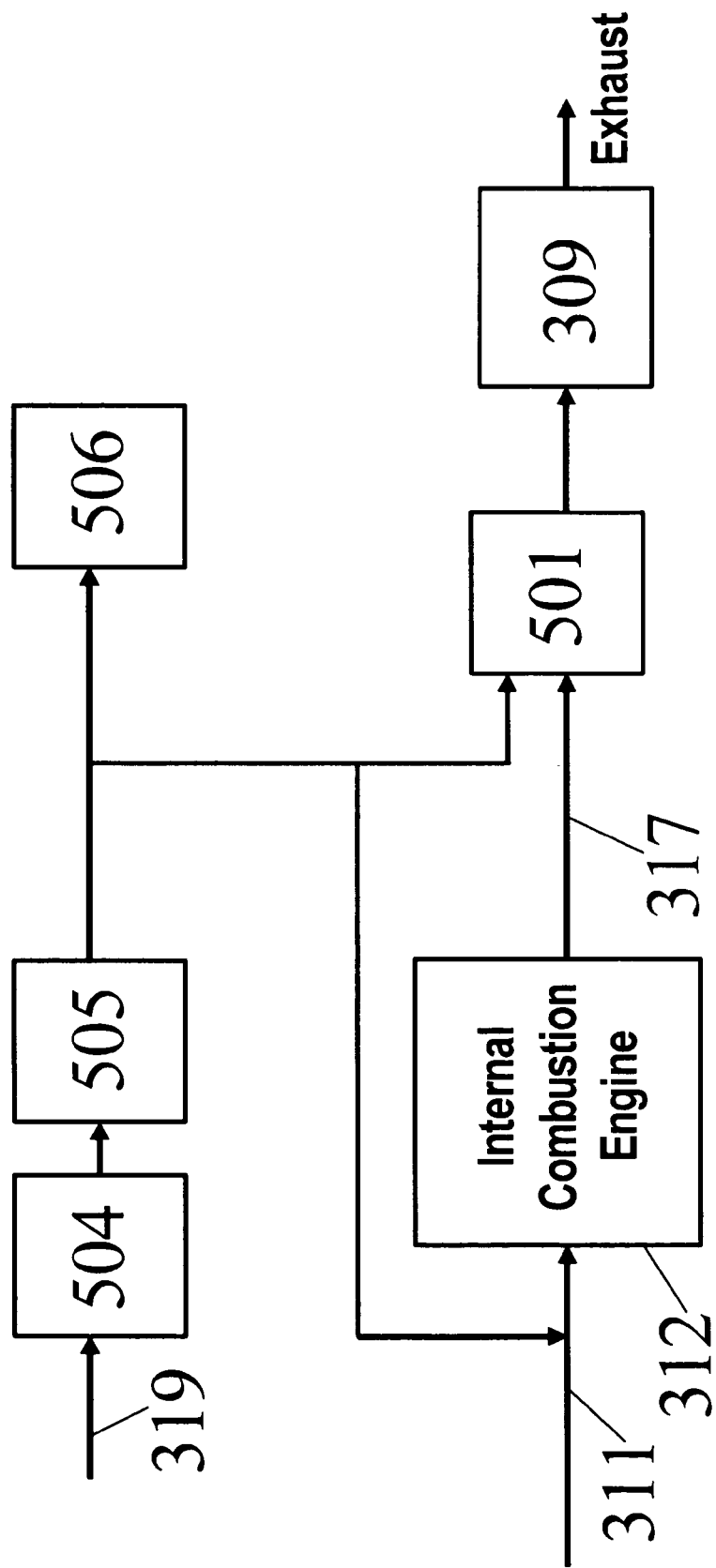

Several embodiments of the present invention will now be described specifically in connection with a spark ignited gasoline internal combustion engine. In these embodiments gasoline fuel from fuel source 301 is combusted in engine 312 and a portion of the gasoline is steam reformed in system 300 as shown in FIG. 3. As is shown in FIG. 5, the engine exhaust stream 317 flows through catalytic converter 501 and then exhaust gas condenser 309 before being emitted into the atmosphere. The hydrogen rich gas stream 319 optionally and preferably is treated in a water gas shift reactor 504 to increase the hydrogen content and lower the CO content of the gas. Optionally the product gas stream is physically treated in device 505 to adjust the temperature and pressure of the gas stream. After any such treatment the hydrogen enriched stream may be utilized in any one of a number of ways. It may be introduced into engine 312 for combustion therein, either alone or admixed with gasoline thereby extending the lean burn limit of the engine. As is shown in FIG. 5 the hydrogen enriched gas may be introduced into the catalytic converter 501 for combusting hydrocarbons emitted from the engine thereby enhancing the effectiveness of the exhaust gas treatment system. Yet another option is to use at least a portion of the hydrogen enriched gas stream as a fuel for a fuel cell 506, such as a polymer electrolyte membrane fuel cell to provide electric power for auxiliary power needs.

Figure 6:
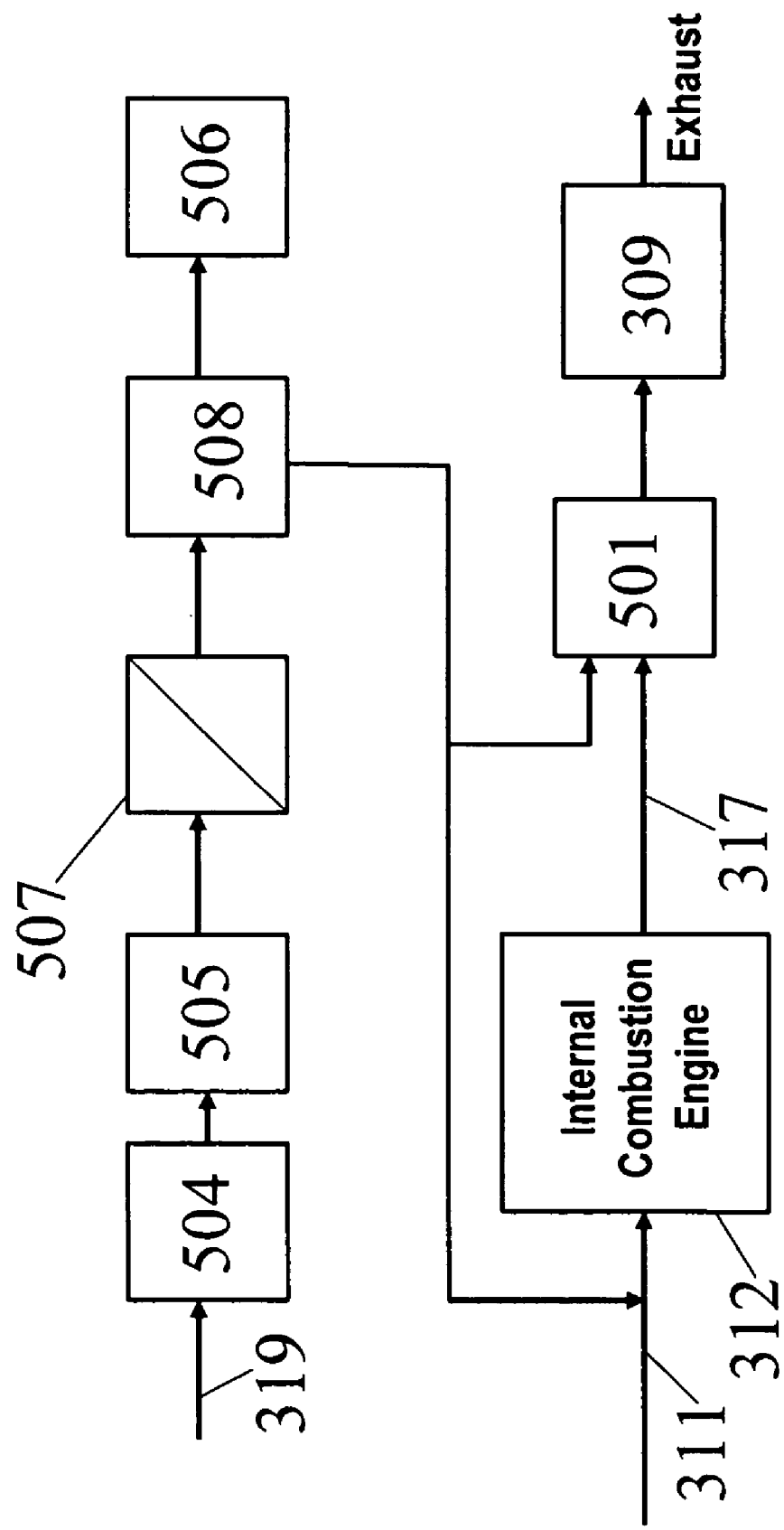
Figure 7A:
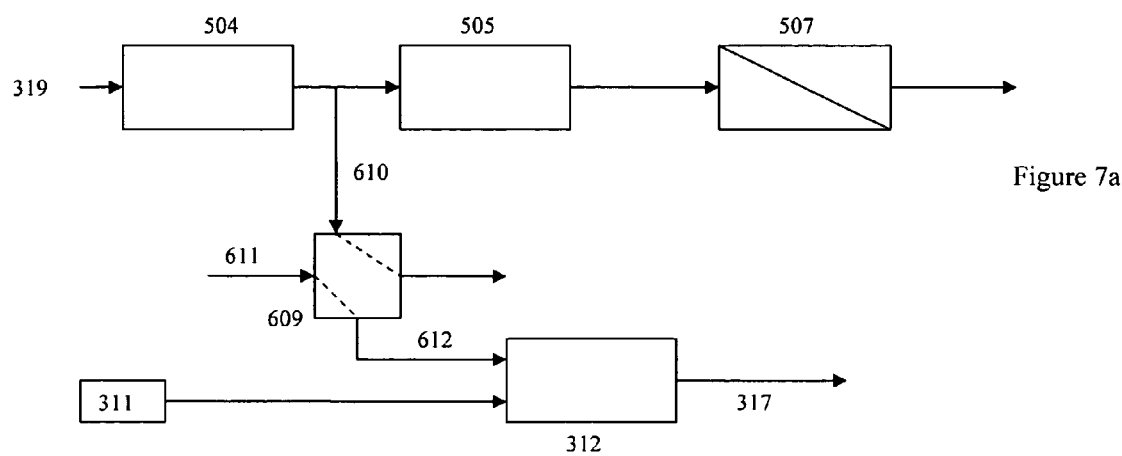
FIGS. 7a and 7b illustrate yet further embodiments of the present invention.
Figure 7B:
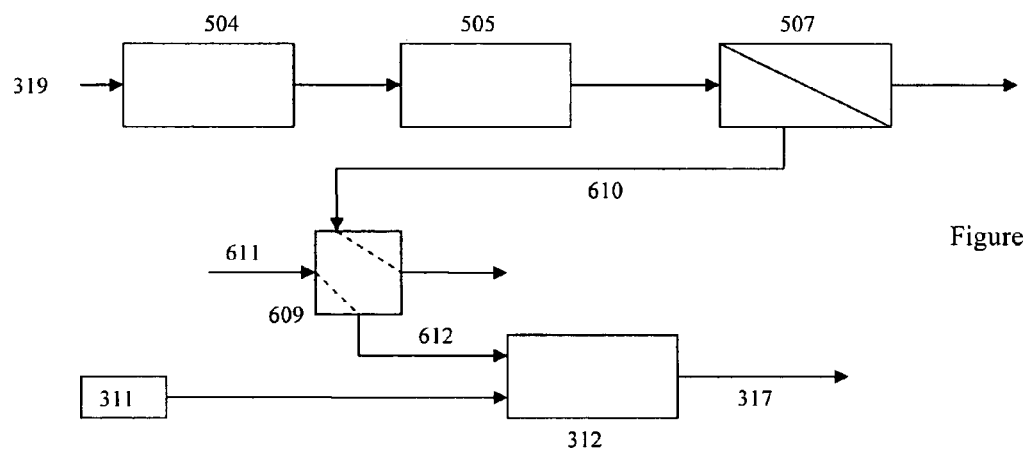

In yet another embodiment as shown in FIGS. 7a and 7b, a pressure transferring device 609 such as an expander compressor is used to pressurize air for the engine. Thus as is shown in FIG. 7a, the hydrogen containing syn gas stream 319 is treated in the water gas shift reactor to produce a hydrogen enriched gas stream 610 at least a part of which is first sent to the pressure transferring device 609 before utilization as set forth in the various embodiments described in connection with FIGS. 4 to 6. Air for use in engine 312 is delivered via line 611 to device 609 for pressurization and then via line 612 to engine 312. Optionally, as is shown in FIG. 7b, at least a portion of the hydrogen separated in separator 507 is delivered via line 614 to pressure transferring device 609 before being utilized in one of the ways described above. As with the embodiment shown in FIG. 7a, air via line 611 is pressurized in device 609 and sent via line 612 for use in engine 312.

What is claimed is:

1. A method for producing a hydrogen containing gas for use in an internal combustion engine system, the method comprising:
   (a) cyclically operating at least two pressure swing reformers reactors in which at least one reactor is reforming while at least one reactor is regenerating, thereby producing a continuous stream of a hydrogen containing gas;
   (b) during operation of the engine system whereby exhaust gas is generated, feeding at least a portion of the exhaust gas to at least one pressure swing reactor that is regenerating for adjusting the temperature of the reactor's regenerative beds by adjusting a proportion of non-combustible exhaust gases to combustible fuel and oxidant whereby adding said non-combustible exhaust gas reduces the temperature of the reactors regenerative beds; and
   (c) using the hydrogen containing gas in at least one of:
   (i) the engine for combustion therein;
   (ii) an engine exhaust stream treatment device for enhancement of the treatment therein of the engine exhaust stream; and
   (iii) a fuel cell for generating at least a part of the electricity required for operating an electrical device.

2. The method of claim 1 including subjecting the hydrogen containing gas to the water gas shift reaction to increase the hydrogen content thereof.

3. The method of claim 2 including separating the hydrogen from the increased hydrogen content gas stream to provide substantially pure hydrogen.

4. The method of claim 3 wherein the hydrogen is separated by a membrane separator or a pressure swing adsorption separator.

5. The method of any one of claims 1 to 4 wherein the engine system is a diesel engine system and wherein at least part of the hydrogen produced is used in at least one exhaust stream treatment device.

6. The method of either claim 3 or 4 wherein the engine system is a diesel engine system anal at least part of the hydrogen is used to power a fuel cell.

7. The method of any one of claims 1 to 4 wherein the engine system is a spark ignited engine system.

8. The method of claim 7 wherein a portion of the hydrogen is fed to the engine for combustion therein.

9. The method of claim 7 wherein a portion of the hydrogen is used in an exhaust stream treatment device.

10. The method of either claim 3 or 4 wherein the engine system is a spark ignited engine system and at least part of the hydrogen is used to power a fuel cell.

11. The method of claim 1 including feeding at least a portion of the exhaust gas to the one of the pressure swing reformers that is reforming to supply steam for the reforming cycle.

12. The method of claim 1 including generating steam for the reactor operating in the reforming cycle by heat exchange between water and the exhaust gas.

13. The method of claim 12 wherein the water is obtained from an exhaust gas condenser.

14. The method of claim 12 wherein the water is obtained from a water storage vessel.

15. The method of claim 1 wherein the pressure swing reactor is operated under conditions sufficient to produce a hydrogen containing gas at pressures above ambient pressures.

16. The method of claim 15 wherein the conditions are sufficient to produce the hydrogen containing gas at pressures of from about 5 to about 15 atmospheres.

17. The method of claim 15 or 16 wherein at least part of the hydrogen containing gas is used in a pressure transferring device to pressurize an air stream utilized in the engine.

18. The method of claim 17 wherein the hydrogen containing gas is first subjected to the water gas shift reaction before being used in the pressure transferring device.

19. The method of claim 17 wherein the hydrogen containing gas is subjected to separation in a separator before being used in the pressure transferring device.

* * * * *